United States Patent
Takeuchi

(10) Patent No.: US 10,434,646 B2
(45) Date of Patent: Oct. 8, 2019

(54) ROBOT CONTROL APPARATUS, ROBOT, AND ROBOT SYSTEM

(71) Applicant: Seiko Epson Corporation, Tokyo (JP)

(72) Inventor: Kaoru Takeuchi, Azumino (JP)

(73) Assignee: Seiko Epson Corporation (JP)

( * ) Notice: Subject to any disclaimer, the term of this patent is extended or adjusted under 35 U.S.C. 154(b) by 253 days.

(21) Appl. No.: 15/455,326

(22) Filed: Mar. 10, 2017

(65) Prior Publication Data

US 2017/0259431 A1 Sep. 14, 2017

(30) Foreign Application Priority Data

Mar. 11, 2016 (JP) .................................. 2016-047947

(51) Int. Cl.
 *B25J 13/02* (2006.01)
 *B25J 9/16* (2006.01)

(52) U.S. Cl.
 CPC ... *B25J 9/1633* (2013.01); *G05B 2219/39241* (2013.01); *G05B 2219/39322* (2013.01)

(58) Field of Classification Search
 CPC ........ B25J 9/1633; B25J 13/02; B25J 13/085; B25J 9/1687; G05B 2219/39322; G05B 2219/40032; G05B 2219/40087; G05B 19/425
 USPC ..................................... 700/260; 318/868.11
 See application file for complete search history.

(56) References Cited

U.S. PATENT DOCUMENTS

| | | | | |
|---|---|---|---|---|
| 6,553,652 | B2* | 4/2003 | Sakakibara | B25J 9/1633 29/709 |
| 7,949,431 | B2* | 5/2011 | Sato | B23P 19/12 700/245 |
| 9,032,603 | B2* | 5/2015 | Yamamoto | B23P 19/105 29/407.1 |
| 2005/0113971 | A1* | 5/2005 | Zhang | B25J 9/1633 700/245 |
| 2008/0312769 | A1 | 12/2008 | Sato et al. | |

FOREIGN PATENT DOCUMENTS

| | | |
|---|---|---|
| JP | 03-161290 A | 7/1991 |
| JP | 06-126665 A | 5/1994 |
| JP | 2003-305678 A | 10/2003 |
| JP | 2008-307634 A | 12/2008 |

* cited by examiner

*Primary Examiner* — Dalena Tran

(74) *Attorney, Agent, or Firm* — Harness, Dickey & Pierce, P.L.C.

(57) ABSTRACT

A robot control apparatus includes a robot control part that controls a robot; and a force detection information acquisition part that acquires force detection information from a force detector. The robot control part allows the robot to move a first object closer to a second object and, if a magnitude of at least one of a force and moment contained in the force detection information exceeds a predetermined first threshold value, to perform an operation of bringing a first surface of the first object into surface contact with a second surface of the second object according to position control and force control based on a predetermined distance and a predetermined velocity.

15 Claims, 10 Drawing Sheets

ROBOT CONTROL APPARATUS, ROBOT, AND ROBOT SYSTEM

BACKGROUND

1. Technical Field

The present invention relates to a robot control apparatus, a robot, and a robot system.

2. Related Art

Research and development of technologies for robots to assemble objects based on forces and moment detected by force sensor of the robots are carried out.

In this regard, a robot including a hand and a force sensors that, when fitting two works together, corrects a position of the hand with respect to a direction perpendicular to a fitting direction and an attitude of the hand with respect to the fitting direction so that force and moment detected by the force sensor may be equal to or less than predetermined threshold values is known (see Patent Document 1 (JP-A-2008-307634)).

However, in the robot, amounts of movement when the position and the attitude of the hand are corrected are calculated according to the force and the moment detected by the force sensor. Accordingly, in the robot, when the force and the moment are smaller, the amounts of movement are smaller. As a result, in the robot, the time taken for fitting the two works together may be longer and work efficiency may be reduced.

SUMMARY

An aspect of the invention is directed to a robot control apparatus comprising: a robot control part that controls a robot; and a force detection information acquisition part that acquires force detection information from a force detector. the robot control part allows the robot to move a first object closer to a second object and, if a magnitude of at least one of a force and moment contained in the force detection information exceeds a predetermined first threshold value, to perform an operation of fitting a first fitting part of the first object in a second fitting part of the second object according to position control and force control based on a predetermined distance and a predetermined velocity.

According to this configuration, the robot control apparatus moves the first object closer to the second object and, if the magnitude of at least one of the force and the moment detected by the force detector exceeds the predetermined first threshold value, starts to allow the robot to perform the operation of bringing the first surface of the first object into surface contact with the second surface of the second object according to the position control and the force control based on the predetermined distance and the predetermined velocity. Thereby, the robot control apparatus may suppress a longer time taken for the work of bringing the first object and the second object into surface contact.

Another aspect of the invention is directed to a robot control apparatus that allows a robot to move a first object closer to a second object and, if a magnitude of at least one of a force and moment detected by a force detector exceeds a predetermined first threshold value, to start to perform an operation of fitting a first fitting part of the first object in a second fitting part of the second object according to position control and force control based on a predetermined distance and a predetermined velocity.

According to this configuration, the robot control apparatus moves the first object closer to the second object and, if the magnitude of at least one of the force and the moment detected by the force detector exceeds the predetermined first threshold value, starts to allow the robot to perform the operation of fitting the first fitting part of the first object in the second fitting part of the second object according to the position control and the force control based on the predetermined distance and the predetermined velocity. Thereby, the robot control apparatus may suppress a longer time taken for the work of fitting the first object and the second object together.

Another aspect of the invention is directed to the robot control apparatus, in which the predetermined distance is determined as a distance to which the first object moves until the magnitude becomes less than a predetermined second threshold value when the first object at a time when the magnitude exceeds the first threshold value is moved based on the predetermined velocity.

According to this configuration, when moving the first object at the time when the magnitude of at least one of the force and the moment detected by the force detector exceeds the first threshold value based on the predetermined velocity using the robot, the robot control apparatus moves the first object by the position control based on the predetermined distance as the distance to which the first object moves until the magnitude becomes less than the predetermined second threshold value and the predetermined velocity. Thereby, the robot control apparatus may suppress the longer time taken for the work of bringing the first object and the second object into surface contact based on the predetermined distance as the distance to which the first object moves until the magnitude becomes less than the predetermined second threshold value and the predetermined velocity.

Another aspect of the invention is directed to the robot control apparatus, in which the robot control part performs the force control not the position control after the magnitude becomes less than the second threshold value.

According to this configuration, after the magnitude of at least one of the force and the moment detected by the force detector becomes less than the predetermined second threshold value, the robot control apparatus performs the force control not the position control. Thereby, the robot control apparatus may suppress the deformation of the object by the operation of the robot according to the position control after the magnitude of at least one of the force and the moment detected by the force detector becomes less than the second threshold value.

Another aspect of the invention is directed to the robot control apparatus, in which the robot control part performs the force control not the position control before the magnitude exceeds the first threshold value.

According to this configuration, before the magnitude of at least one of the force and the moment detected by the force detector exceeds the first threshold value, the robot control apparatus performs the force control not the position control. Thereby, the robot control apparatus may suppress the deformation of the object by the operation of the robot according to the position control before the magnitude of at least one of the force and the moment detected by the force detector exceeds the first threshold value.

Another aspect of the invention is directed to a robot that is controlled by the robot control apparatus described above.

According to this configuration, the robot moves the first object closer to the second object and, if the magnitude of at least one of the force and the moment detected by the force detector exceeds the predetermined first threshold value, starts to perform the operation of bringing the first surface of the first object into surface contact with the second surface of the second object or fitting the first surface of the first object in the second surface of the second object according to the position control and the force control based on the predetermined distance and the predetermined velocity. Thereby, the robot may suppress the longer time taken for the work of bringing the first object and the second object into surface contact or fitting the first object and the second object together.

Another aspect of the invention is directed to a robot system including the robot control apparatus described above and a robot controlled by the robot control apparatus described above.

According to this configuration, the robot system moves the first object closer to the second object and, if the magnitude of at least one of the force and the moment detected by the force detector exceeds the predetermined first threshold value, starts to allow the robot to perform the operation of bringing the first surface of the first object into surface contact with the second surface of the second object or fitting the first surface of the first object in the second surface of the second object according to the position control and the force control based on the predetermined distance and the predetermined velocity. Thereby, the robot system may suppress the longer time taken for the work of bringing the first object and the second object into surface contact or fitting bringing the first object and the second object together.

As described above, the robot control apparatus and the robot system move the first object closer to the second object and, if the magnitude of at least one of the force and the moment detected by the force detector exceeds the predetermined first threshold value, start to allow the robot to perform the operation of bringing the first surface of the first object into surface contact with the second surface of the second object or fitting the first surface of the first object in the second surface of the second object according to the position control and the force control based on the predetermined distance and the predetermined velocity. Thereby, the control apparatus and the robot system may suppress the longer time taken for the work of bringing the first object and the second object into surface contact or fitting bringing the first object and the second object together.

Further, the robot moves the first object closer to the second object and, if the magnitude of at least one of the force and the moment detected by the force detector exceeds the predetermined first threshold value, starts to perform the operation of bringing the first surface of the first object into surface contact with the second surface of the second object or fitting the first surface of the first object in the second surface of the second object according to the position control and the force control based on the predetermined distance and the predetermined velocity. Thereby, the robot may suppress the longer time taken for the work of bringing the first object and the second object into surface contact or fitting bringing the first object and the second object together.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

As below, an embodiment of the invention will be explained with reference to the drawings.
Configuration of Robot System First, a configuration of a robot system 1 is explained.

Figure 1:
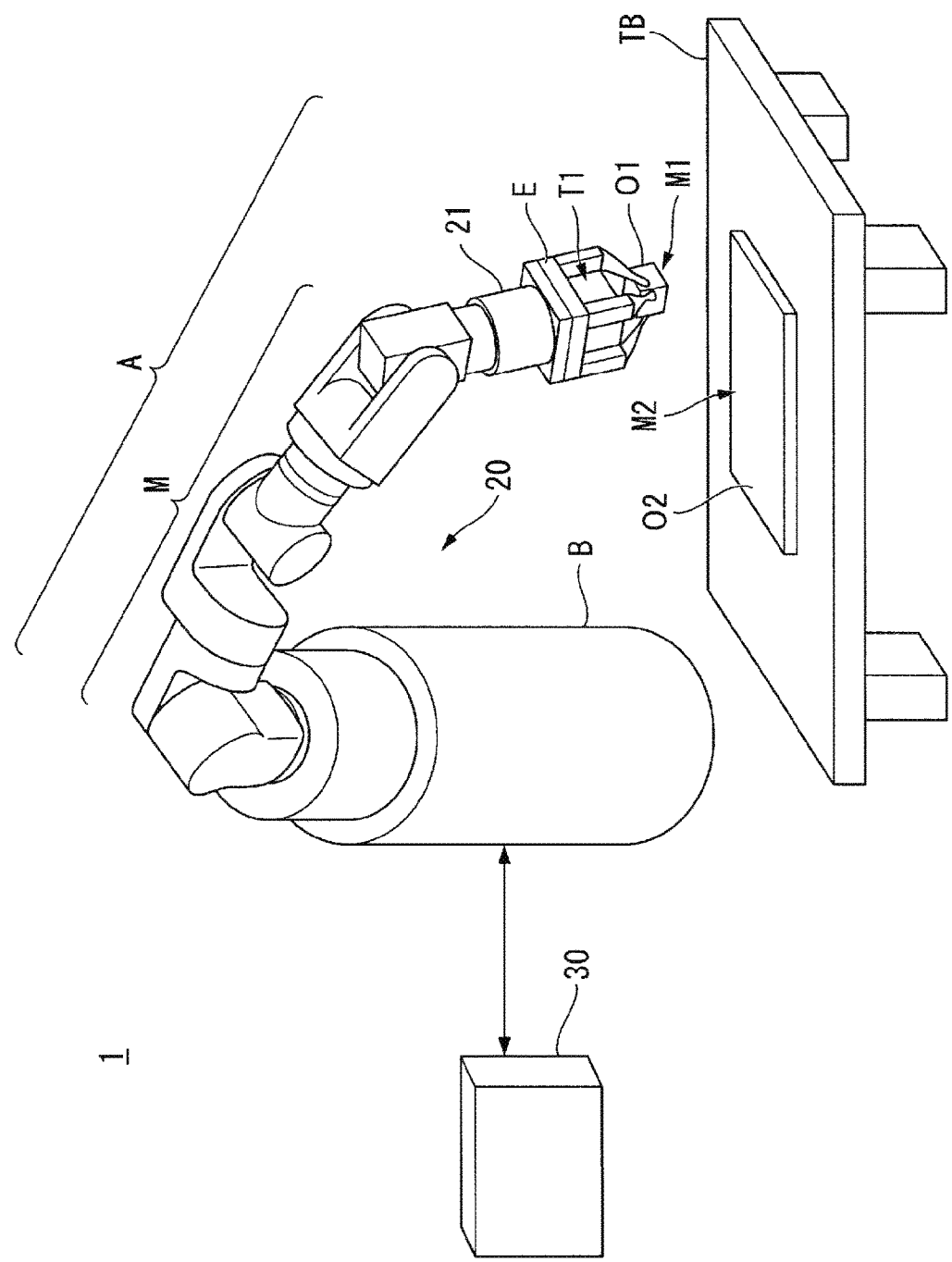
FIG. 1 shows an example of a configuration of a robot system 1 according to an embodiment.

FIG. 1 shows an example of a configuration of the robot system 1 according to the embodiment. The robot system 1 includes a robot 20 and a robot control apparatus 30.

The robot 20 is a single-arm robot including an arm A and a support B that supports the arm A. The single-arm robot is a robot including a single arm like the arm A in the example. Note that the robot 20 may be a multi-arm robot in place of the single-arm robot. The multi-arm robot is a robot including two or more arms (e.g. two or more arms A). Of the multi-arm robots, the robot including two arms is also called a dual-arm robot. That is, the robot 20 may be a dual-arm robot including two arms or a multi-arm robot including three or more arms (e.g. three or more arms A). Or, the robot 20 may be another robot such as a scalar robot or Cartesian coordinate robot. The Cartesian coordinate robot is e.g. a gantry robot.

The arm A includes an end effector E, a manipulator M, and a force detection unit 21.

The end effector E is an end effector having hook portions that can grasp an object in the example. Note that the end effector E may be another end effector such as an end effector that can lift an object by air suction, magnetic force, a jig, or the like in place of the end effector having the hook portions.

The end effector E is communicably connected to the robot control apparatus 30 by a cable. Thereby, the end effector E performs actions according to control signals acquired from the robot control apparatus 30. Wired communications via the cable are performed according to standards of e.g. Ethernet (registered trademark), USB (Universal Serial Bus), or the like. Or, the end effector E may be adapted to be connected to the robot control apparatus via wireless communications performed according to communication standards of Wi-Fi (registered trademark) or the like.

The manipulator M has seven joints. Further, each of the seven joints has an actuator (not shown). In other words, the arm A having the manipulator M is a seven-axis vertical articulated arm. The arm A performs actions with the degree of freedom of seven axes by cooperative motion of the support B, the end effector E, the manipulator M, and the respective actuators of the seven joints of the manipulator M. Note that the arm A may be adapted to operate with the degree of freedom of six or less axes or the degree of freedom of eight or more axes.

When the arm A acts with the degree of freedom of seven axes, the number of attitudes that can be taken is larger than that in the case where the arm A acts with the degree of freedom of six or less axes. Thereby, the arm A may smoothly move and easily avoid interferences with objects existing around the arm A, for example. Further, when the arm A acts with the degree of freedom of seven axes, control of the arm A is easier than that in the case where the arm A acts with the degree of freedom of eight or more axes because the calculation amount is less.

The seven actuators (of the joints) of the manipulator M are respectively communicably connected to the robot control apparatus 30 by cables. Thereby, the actuators operate the manipulator M based on the control signals acquired from the robot control apparatus 30. Further, each of the actuators includes an encoder. Each encoder outputs information representing a rotation angle of the actuator having the encoder to the robot control apparatus 30. Wired communications via the cables are performed according to standards of e.g. Ethernet (registered trademark), USB, or the like. Or, part or all of the seven actuators of the manipulator M may be adapted to be connected to the robot control apparatus via wireless communications performed according to communication standards of Wi-Fi (registered trademark) or the like.

The force detection unit 21 is provided between the end effector E and the manipulator M. The force detection unit 21 is e.g. a force sensor. The force detection unit 21 detects a force and moment acting on the end effector E or an object grasped by the end effector E. Specifically, the force detection unit 21 detects magnitudes of forces acting on the end effector E or the object and acting in the respective directions of an X-axis, a Y-axis, and a Z-axis of a force detection coordinate system. Further, the force detection unit 21 detects magnitudes of moment acting on the end effector E or the object and acting about the respective X-axis, Y-axis, and Z-axis. The force detection unit 21 outputs force detection information containing force detection values indicating these detected magnitudes to the robot control apparatus 30 via communications. The force detection coordinate system is a three-dimensional local coordinate system associated with the force detection unit 21 to move with the force detection unit 21.

The force detection information is used for force control based on the force detection information of the arm A by the robot control apparatus 30. The force control refers to e.g. compliant motion control such as impedance control. Note that the force detection unit 21 may be another sensor such as a torque sensor that detects a force and moment acting on the end effector E or an object grasped by the end effector E.

The force detection unit 21 is communicably connected to the robot control apparatus 30 by a cable. Wired communications via the cable are performed according to standards of e.g. Ethernet (registered trademark), USB, or the like. Note that the force detection unit 21 and the robot control apparatus 30 may be adapted to be connected via wireless communications performed according to communication standards of Wi-Fi (registered trademark) or the like.

The robot control apparatus 30 is a robot controller in the example. The robot control apparatus 30 acquires information representing the rotation angles of the respective actuators from the encoders provided in the respective joints of the manipulator M. The robot control apparatus 30 generates control signals based on the acquired information representing the rotation angles. The robot control apparatus 30 transmits the generated control signals to the robot 20 to operate the respective actuators, and thereby, operates the robot 20. Here, the control signals include control signals for controlling the end effectors E. The robot control apparatus 30 operates the robot 20 in this manner, and allows the robot 20 to perform a predetermined work. The robot control apparatus 30 may be provided in the robot 20 instead of being provided outside of the robot 20.

Predetermined Work by Robot

As below, the predetermined work performed by the robot 20 will be explained.

The robot 20 performs a work of bringing a first surface M1 of a first object O1 grasped by the end effector E into surface contact with a second surface M2 of a second object as the predetermined work.

The first object O1 is an industrial component, member, product, or the like. Note that the first object O1 may be another object such as a commodity component, member, product different from those for industry or a living organism instead. In the example shown in FIG. 1, the first object O1 is shown as an object having a rectangular parallelepiped shape. The shape of the first object O1 may be another shape in place of the rectangular parallelepiped shape.

The first surface M1 of the first object O1 is a surface farthest from the center of gravity of the end effector E of the surfaces of the first object O1 grasped by the end effector E in the example. Note that the first surface M1 may be another surface except the surface farthest from the center of gravity of the end effector E of the surfaces of the first object O1 grasped by the end effector E instead.

As shown in FIG. 1, the first object O1 is grasped by the end effector E in advance. Note that it is not necessarily required that the first object O1 is grasped by the end effector E in advance. In this case, the predetermined work includes a work by the robot 20 grasping the first object O1 placed in a supply area (not shown) using the end effector E.

The second object O2 is an industrial component, member, product, or the like. Note that the second object O2 may be another object such as a commodity component, member, product different from those for industry or a living organism instead. In the example shown in FIG. 1, the second object O2 is shown as an object having a flat plate shape. The shape of the second object O2 may be another shape in place of the flat plate shape. Further, the second object O2 is mounted on an upper surface of a workbench TB in advance. The workbench TB is a table or the like in the example. Note that the workbench TB may be another object such as a floor surface or rack as long as it has a surface on which the second object O2 can be mounted instead.

The second surface M2 of the second object O2 is e.g. an upper surface of the second object O2. The upper surface is a surface opposite to a lower surface as a surface in surface contact with the workbench TB of the surfaces of the second object O2. Note that the second surface M2 may be another surface of the second object O2 than that surface.

Outline of Processing by Robot Control Apparatus

As below, the outline of the processing performed by the robot control apparatus 30 will be explained.

The robot control apparatus 30 sets a control point T1 as a TCP (Tool Center Point) moving with the end effector E in a position associated with the end effector E in advance. The position associated with the end effector E in advance is e.g. a position of a center of gravity of the first object O1 grasped by the end effector E in advance. Note that the position associated with the end effector E may be another position such as the center of gravity of the end effector E instead or some position associated with the manipulator M.

Control point position information as information representing the position of the control point T1 and control point attitude information as information representing the attitude of the control point T1 are associated with the control point T1. Note that other information may be additionally associated with the control point T1. When the robot control apparatus 30 designates (determines) the control point position information and the control point attitude information, the position and the attitude of the control point T1 are determined. The robot control apparatus 30 moves the arm A and allows the position of the control point T1 to coincide with the position represented by the designated control point position information and the attitude of the control point T1 to coincide with the attitude represented by the designated control point attitude information. That is, the robot control apparatus 30 designates the control point position information and the control point attitude information, and thereby, operates the robot 20.

In the example, the position of the control point T1 is indicated by a position of the origin of a control point coordinate system TC1 in a robot coordinate system RC. The attitude of the control point T1 is indicated by directions of the respective coordinate axes of the control point coordinate system TC1 in the robot coordinate system RC. The control point coordinate system TC1 is a three-dimensional local coordinate system associated with the control point T1 to move with the control point T1. In the example, the above described position and attitude of the first object O1 are indicated by the position and the attitude of the control point T1. Further, in the example, the directions of the respective coordinate axes of the control point coordinate system TC1 are the same as the directions of the respective coordinate axes of the above described force detection coordinate system. Note that it is not necessarily required that the directions of the respective coordinate axes of the control point coordinate system TC1 are the same as the directions of the respective coordinate axes of the force detection coordinate system.

The robot control apparatus 30 sets the control point T1 based on control point setting information input by a user in advance. The control point setting information is e.g. information representing relative position and attitude between the position of the center of gravity and the attitude of the end effector E and the position and the attitude of the control point T1. Note that, instead, the control point setting information may be information representing relative position and attitude between some position and attitude associated with the end effector E and the position and the attitude of the control point T1, information representing relative position and attitude between some position and attitude associated with the manipulator M and the position and the attitude of the control point T1, or information representing relative position and attitude between some position and attitude associated with another part of the robot 20 and the position and the attitude of the control point T1.

When moving the control point T1 according to position control, which will be described later, the robot control apparatus 30 moves the control point T1 based on taught point information stored by the user in advance. The taught point information is information representing a taught point. The taught point is a target to move the control point T1 when the robot control apparatus 30 moves the arm A. Taught point position information, taught point attitude information, and taught point identification information are associated with the taught point. The taught point position information is information representing the position of the taught point. The taught point attitude information is information representing the attitude of the taught point. The taught point identification information is information for identification of the taught point.

In the example, the position of the taught point is indicated by a position of the origin of a taught point coordinate system as a three-dimensional coordinate system associated with the taught point in the robot coordinate system RC. Further, the attitude of the taught point is indicated by directions of the respective coordinate axes of the taught point coordinate system in the robot coordinate system RC.

The robot control apparatus 30 operates the robot 20 based on position control and force control in the example.

The position control is control based on the taught point stored in the robot control apparatus 30 in advance or control based on respective speed, direction, distance stored in the robot control apparatus 30 in advance.

Specifically, the robot control apparatus 30 sequentially designates one or more taught points represented by the taught point information based on an operation program input by the user in advance. The robot control apparatus 30 designates the taught point position information associated with a designated taught point as a taught point that has been designated as the control point position information and designates the taught point attitude information associated with the designated taught point as the control point attitude information. That is, the robot control apparatus 30 performs the position control of designating the control point position information and the control point attitude information based on the designated taught point. Thereby, the robot control apparatus 30 may allow the control point T1 to coincide with the designated taught point. Note that, in the example, a coincidence of a certain taught point with the control point T1 refers to a coincidence of the position and the attitude of the taught point with the position and the attitude of the control point T1.

Further, the robot control apparatus 30 calculates a position and an attitude to move the control point T1 based on the direction and the distance stored in advance based on the operation program input by the user in advance. The direction may be a translation direction or rotation direction. The distance may be a translation distance or rotation angle. The robot control apparatus 30 performs position control of designating information representing the calculated position as the control point position information and designating information representing the calculated attitude as the control point attitude information. Thereby, the robot control apparatus 30 may move the control point T1 at the speed stored in advance and allow the position and the attitude of the control point T1 to coincide with the position and the attitude represented by the designated control point position information and control point attitude information.

The force control is control based on the force detection information acquired from the force detection unit 21 by the robot control apparatus 30 as described above. Specifically, the robot control apparatus 30 acquires the force detection information from the force detection unit 21. The robot control apparatus 30 performs force control of changing the position and the attitude of the control point T1 to a position and an attitude that realize a state in which the respective force detection values contained in the acquired force detection information satisfy predetermined conditions. Thereby, the robot control apparatus 30 may move the control point T1 according to the end effector E or the force and the moment acting on the object grasped by the end effector E. As a result, the robot control apparatus 30 may suppress deformation of an object due to an interference between the end effector E or the object grasped by the end effector E and another object.

When moving the control point T1, the robot control apparatus 30 calculates rotation angles of the respective actuators of the manipulator M as rotation angles when the position and the attitude of the control point T1 coincide with the position and the attitude represented by the control point position information and the control point attitude information based on inverse kinematics. The robot control apparatus 30 generates control signals representing the calculated rotation angles. The robot control apparatus 30 transmits the generated control signals to the robot 20 and moves the control point T1 by operating the respective actuators. Thereby, the robot control apparatus 30 allows the robot 20 to perform the predetermined work.

Here, when the robot control apparatus 30 allows the robot 20 to perform the predetermined work only by the force control, if the above described first surface M1 is tilted with respect to the second surface M2 due to an error, the time taken for bringing the first surface M1 into surface contact with the second surface M2 may be longer. This is because the amount of movement of the control point T1 is smaller as the magnitudes of the force and the moment acting on the end effector E or the object grasped by the end effector E are smaller.

Accordingly, when the robot control apparatus 30 allows the robot 20 to perform the predetermined work, the robot control apparatus 30 in the example moves the first object O1 closer to the second object O2 and, if the magnitude of at least one of the force and the moment detected by the force detection unit 21 exceeds a predetermined first threshold value, starts to allow the robot 20 to perform an operation of bringing the first surface M1 of the first object O1 into surface contact with the second surface of the second object O2 according to the position control and the force control based on a predetermined distance and a predetermined velocity. Thereby, the robot control apparatus 30 may suppress the longer time taken for the work of bringing the first object O1 and the second object O2 into surface contact. Here, as will be described later, the predetermined distance may refer to a predetermined angle to which the control point T1 is rotated or a predetermined distance to which the control point T1 is translated.

As below, the processing performed by the robot control apparatus 30 when the robot 20 is allowed to perform the predetermined work will be explained in detail.

Figure 2:
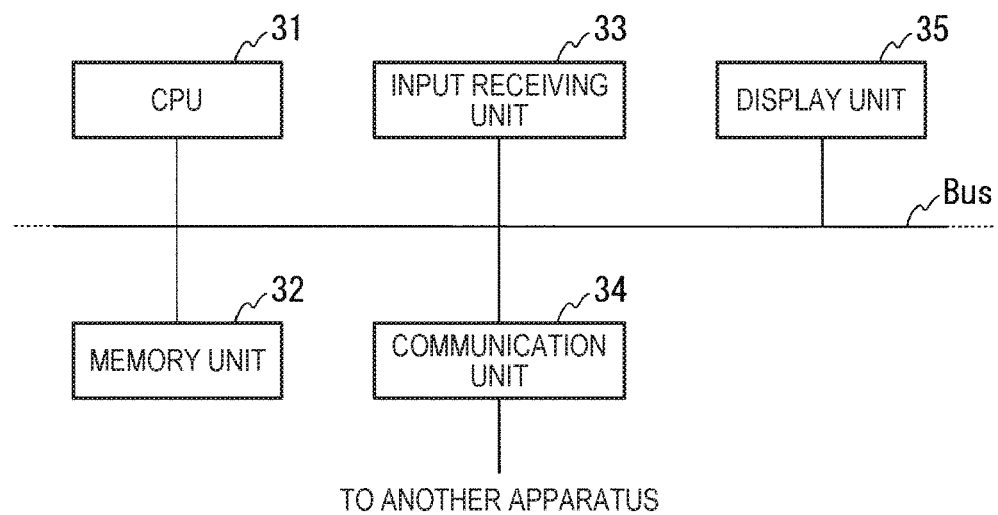
FIG. 2 shows an example of a hardware configuration of a robot control apparatus 30.

Hardware Configuration of Robot Control Apparatus and Information Processing Apparatus As below, referring to FIG. 2, a hardware configuration of the robot control apparatus 30 will be explained. FIG. 2 shows an example of the hardware configuration of the robot control apparatus 30.

The robot control apparatus 30 includes e.g. a CPU (Central Processing Unit) 31, a memory unit 32, an input receiving unit 33, a communication unit 34, and a display unit 35. Further, the robot control apparatus 30 communicates with the robot 20 via the communication unit 34. These component elements are communicably connected to one another via a bus Bus.

The CPU 31 executes various programs stored in the memory unit 32.

The memory unit 32 includes e.g. an HDD (Hard Disk Drive), an SSD (Solid State Drive), an EEPROM (Electrically Erasable Programmable Read-Only Memory), and a ROM (Read-Only Memory), a RAM (Random Access Memory). Note that the memory unit 32 may be an external memory device connected via a digital input-output port including a USB or the like in place of the unit built in the robot control apparatus 30. The memory unit stores various information, images, various programs including operation programs to be processed by the robot control apparatus 30, and taught point information.

The input receiving unit 33 is e.g. a touch panel integrally formed with the display unit 35. Note that the input receiving unit 33 may be an input device including a keyboard, mouse, and touch pad.

The communication unit 34 includes e.g. a digital input-output port such as a USB or an Ethernet (registered trademark) port.

The display unit 35 is e.g. a liquid crystal display panel or an organic EL (ElectroLuminescence) display panel.

Figure 3:
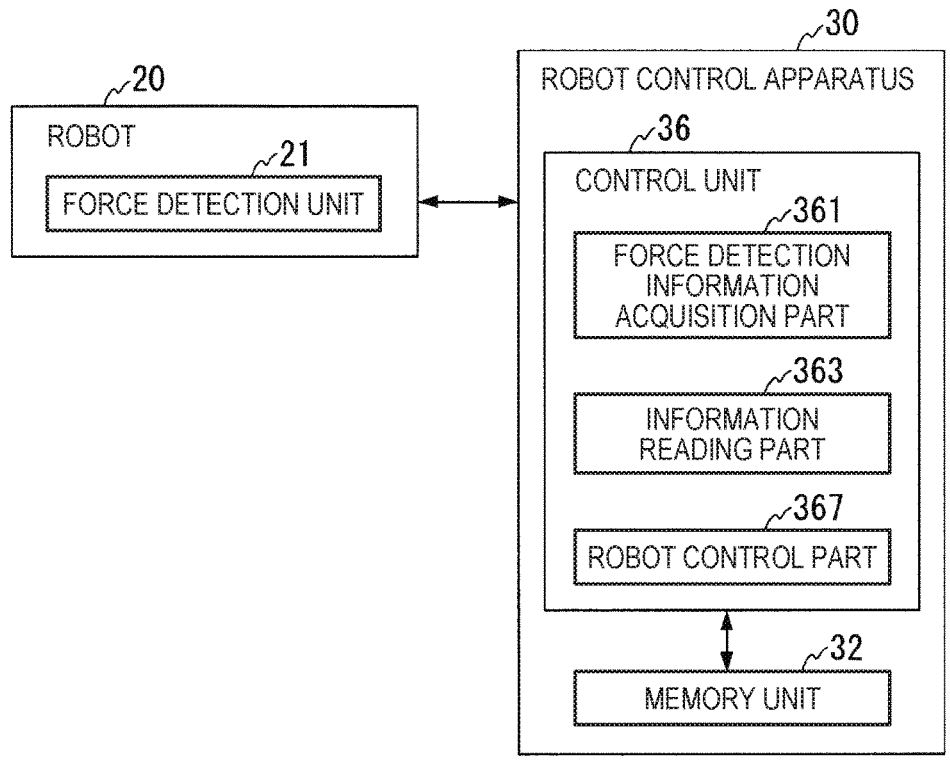
FIG. 3 shows an example of a functional configuration of the robot control apparatus 30.

Functional Configurations of Robot Control Apparatus and Information Processing Apparatus As below, referring to FIG. 3, a functional configuration of the robot control apparatus 30 will be explained. FIG. 3 shows an example of the functional configuration of the robot control apparatus 30.

The robot control apparatus 30 includes the memory unit 32 and a control unit 36.

The control unit 36 controls the entire robot control apparatus 30. The control unit 36 includes a force detection information acquisition part 361, an information reading part 363, and a robot control part 367. These functional parts of the control unit 36 are realized by the CPU 31 executing various programs stored in the memory unit 32, for example. Part or all of the functional parts may be a hardware functional part such as an LSI (Large Scale Integration) or an ASIC (Application Specific Integrated Circuit).

The force detection information acquisition part 361 acquires the force detection information from the force detection unit 21.

The information reading part 363 reads the taught point information from the memory unit 32.

The robot control part 367 operates the robot 20 by the position control based on the taught point information read by the information reading part 363. Further, the robot control part 367 operates the robot 20 by the force control based on the force detection information acquired by the force detection information acquisition part 361. Thereby, the robot control part 367 allows the robot 20 to perform the predetermined work.

Figure 4:
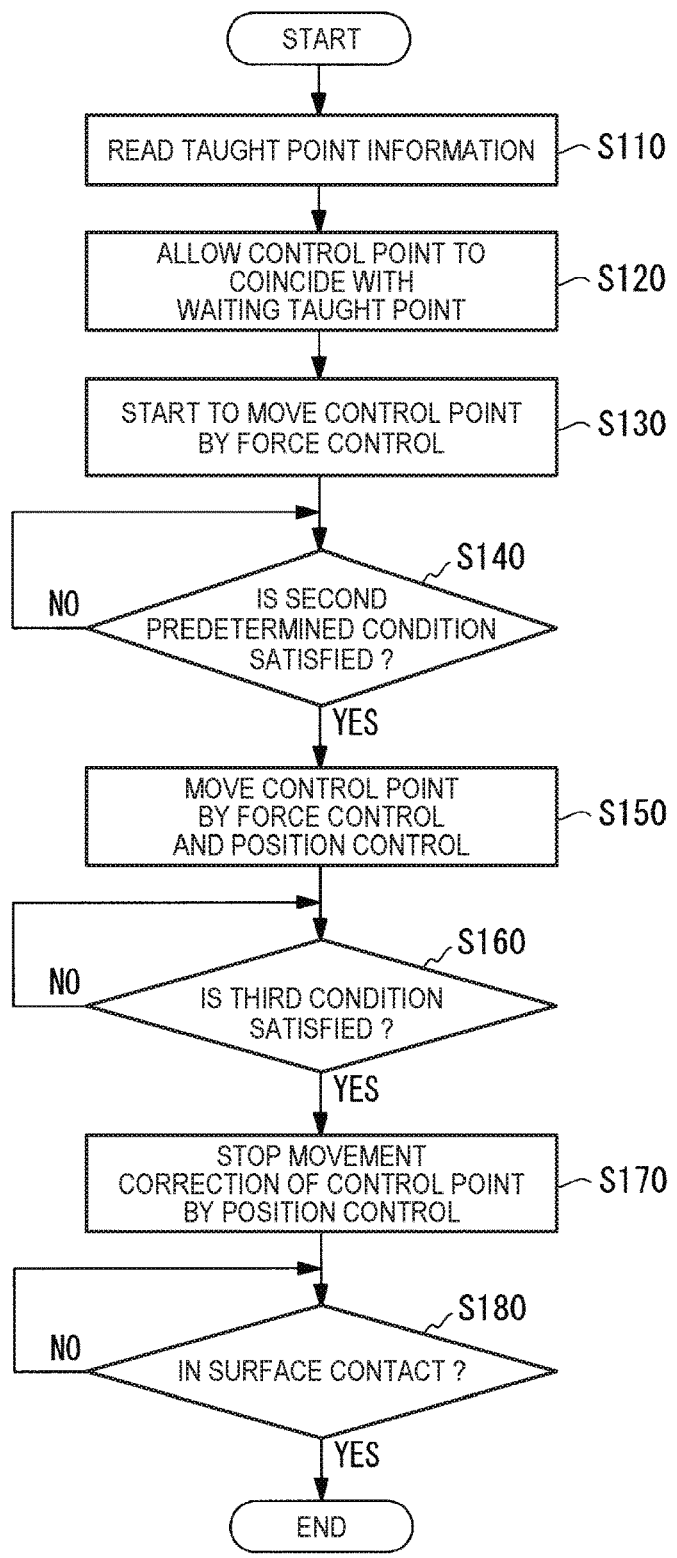
FIG. 4 is a flowchart showing an example of a flow of processing of allowing a robot 20 to perform a predetermined work by the robot control apparatus 30.

Processing of Allowing Robot to Perform Predetermined Work by Robot Control Apparatus As below, referring to FIG. 4, the processing of allowing the robot 20 to perform the predetermined work by the robot control apparatus 30 will be explained. FIG. 4 is a flowchart showing an example of a flow of the processing of allowing the robot 20 to perform the predetermined work by the robot control apparatus 30. Note that, in the flowchart shown in FIG. 4, the case where the taught point information is stored by the user in advance.

The information reading part 363 reads the taught point information stored in the memory unit 32 in advance (step S110). Here, the processing at step S110 is explained. As below, as an example, the case where the taught point information read by the information reading part 363 at step S110 represents a waiting taught point as a taught point stored by the user in advance will be explained. Note that the taught point information may represent another taught point or two or more taught points instead.

The waiting taught point may be any taught point at which the first object O1 is not in contact with the second object O2 when the waiting taught and the control point T1 coincide. As below, as an example, the case where the position of the waiting taught point is a position on a Z-axis of a second object coordinate system O2C set in the position of the center of gravity of the second object O2 in advance and apart from the upper surface of the second object O2 at a predetermined height will be explained. The predetermined height may be any height at which the first object O1 is not in contact with the second object O2 when the control point T1 coincides with the waiting taught point.

The second object coordinate system O2C is a three-dimensional coordinate system indicating the position and the attitude of the second object O2 in the robot coordinate system RC. The position of the second object O2 in the robot coordinate system RC is indicated by the position of the origin of the second object coordinate system in the robot coordinate system RC. Further, the attitude of the second object O2 in the robot coordinate system RC is indicated by directions of the respective coordinate axes of the second object coordinate system O2C in the robot coordinate system RC.

The Z-axis of the second object coordinate system O2C is a coordinate axis orthogonal to the upper surface of the second object O2. Further, an X-axis of the second object coordinate system O2C is a coordinate axis parallel to one side of the fourth sides of the second object O2 having the flat plate shape. Furthermore, a Y-axis of the second object coordinate system O2C is a coordinate axis orthogonal to the X-axis and the Z-axis. Note that the directions of the respective coordinate axes of the second object coordinate system O2C are not limited to those, but may respectively be other directions. Further, the directions of the respective coordinate axes of the second object coordinate system O2C are the same as those of the directions of the respective coordinate axes of the robot coordinate system RC in the example. Note that the directions of the respective coordinate axes of the second object coordinate system O2C may be different from those of the directions of the respective coordinate axes of the robot coordinate system RC instead.

As below, as an example, the case where the attitude of the waiting taught point is the same as the attitude of the second object O2 will be explained. The attitude of the second object O2 is indicated by the directions of the respective coordinate axes of the second object coordinate system O2C in the robot coordinate system RC. Note that the attitude of the waiting taught point may be another attitude instead.

Figure 5:
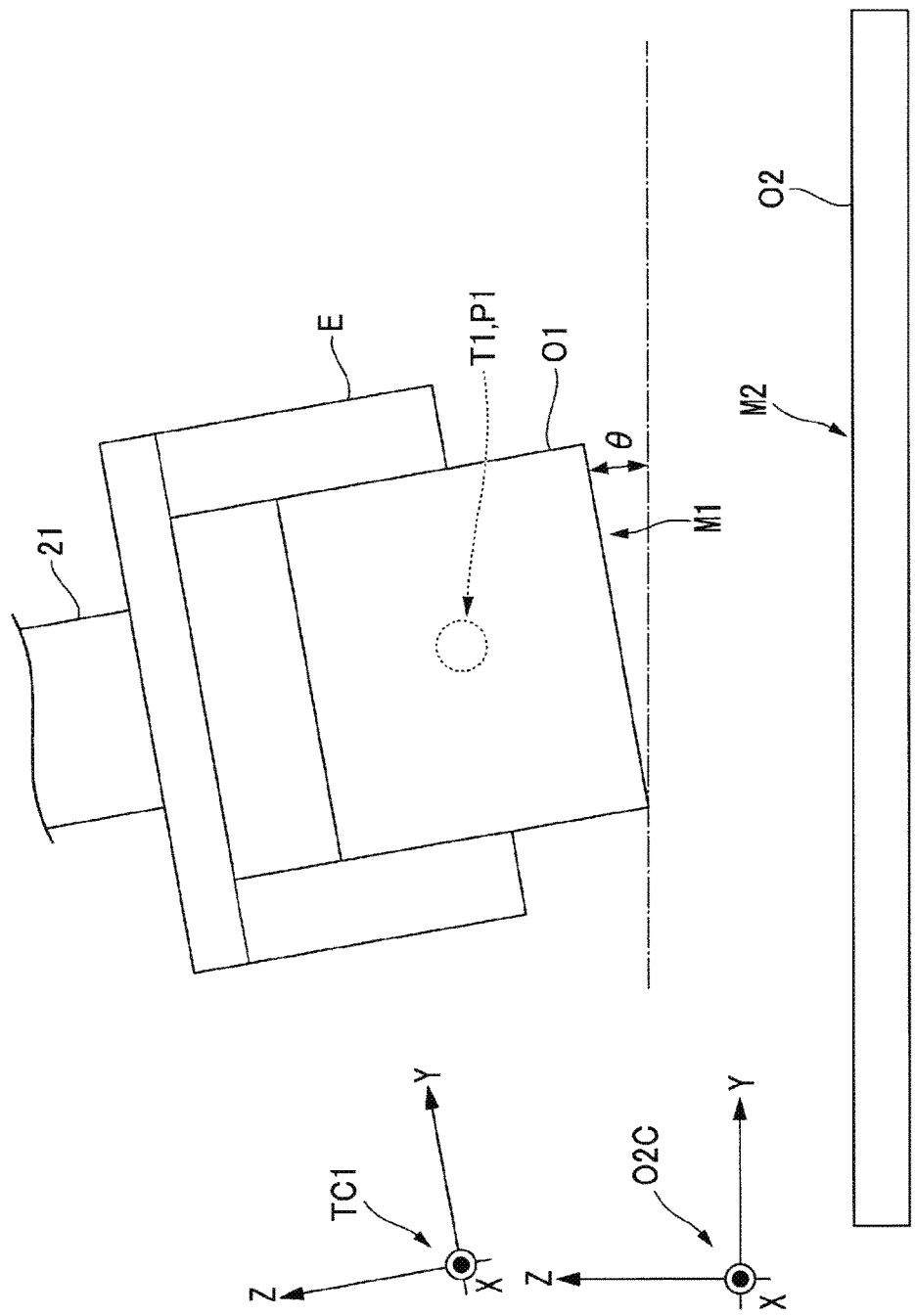
FIG. 5 shows an example of a state in which awaiting taught point and a control point T1 coincide.

The information reading part 363 reads the taught point information from the memory unit 32 at step S110, and then, the robot control part 367 moves the control point T1 by the position control and allows the control point T1 to coincide with the waiting taught point represented by the read taught point information (step S120). Here, referring to FIG. 5, the processing at step S120 is explained. FIG. 5 shows an example of a state in which the waiting taught point and the control point T1 coincide. Further, FIG. 5 is a side view of the first object O1 and the second object O2 in the state as seen from the negative direction to the positive direction of the X-axis of the second object coordinate system O2C shown in FIG. 5.

As shown in FIG. 5, at step S120, the robot control part 367 allows the control point T1 to coincide with the waiting taught point P1. In this case, the attitude of the control point T1 and the attitude of the second object O2 should be the same. However, when the robot control part 367 allows the control point T1 to coincide with the waiting taught point by the position control, the attitude of the control point T1, i.e., the attitude of the first object O1 may be different from the attitude of the second object O2 due to an error. The error includes e.g. an error caused by rigidity of the member forming the manipulator M and an error by assembly of the manipulator M and the manipulator M and the support B. In the example shown in FIG. 5, the attitude of the first object O1 and the attitude of the second object O2 are different due to the error.

As below, as an example, the case where the first surface M1 is tilted by an angle θ with respect to the second surface M2 due to the above described error when the first object O1 and the second object O2 are seen from the negative direction to the positive direction of the X-axis of the second object coordinate system O2C in the state in which the waiting taught point and the control point T1 coincide will be explained. That is, in the example, in this case, the attitude of the first object O1 is rotated counterclockwise by the angle θ about the X-axis of the control point coordinate system TC1 and tilted with respect to the attitude of the second object O2. Note that the attitude of the first surface M1 may be rotated counterclockwise or clockwise about another axis of the control point coordinate system TC1 or rotated counterclockwise or clockwise about two or more axes of the control point coordinate system TC1. Or, in the case where the first surface M1 is tilted by the angle θ with respect to the second surface M2 due to the above described error, when the control point T1 is allowed to coincide with the waiting taught point, the control point may be constantly rotated counterclockwise or clockwise by the angle θ about the X-axis of the control point coordinate system TC1 in advance so that the first surface M1 and the second surface M2 may be parallel.

Figure 6:
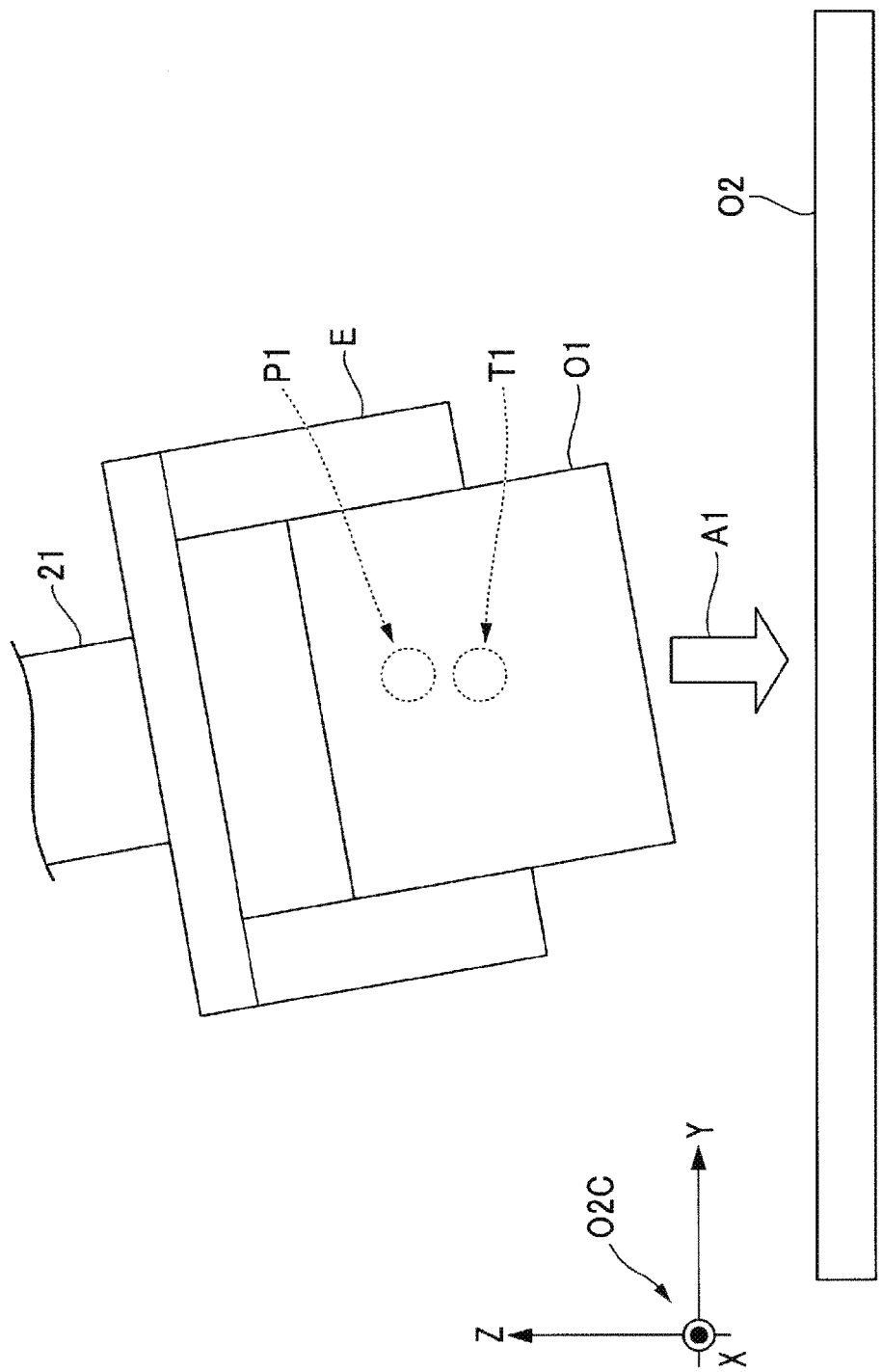
FIG. 6 shows an example of a state in which a first object O1 is moving closer to a second object O2 by the processing at step S130.

The control point T1 is allowed to coincide with the waiting taught point at step S120, and then, the robot control part 367 starts to move the control point T1 by the force control and move the first object O1 and the second object O2 closer to each other (step S130). Here, referring to FIG. 6, the processing at step S130 is explained. FIG. 6 shows an example of a state in which the first object O1 is moving closer to the second object O2 by the processing at step S130.

As shown in FIG. 6, by the processing at step S130, the robot control part 367 moves the control point T1 closer to the second object O2, and thereby, moves the first object O1 and the second object O2 closer to each other. In the example, the robot control part 367 moves the control point T1 in a direction A1 indicated by an arrow shown in FIG. 6, and thereby, moves the first object O1 and the second object O2 closer to each other. The direction A1 is e.g. a direction along the Z-axis of the second object coordinate system O2C in which the first object O1 and the second object O2 come closer to each other. Note that the direction A1 may be another direction in which the first object O1 and the second object O2 come closer to each other instead.

Specifically, the robot control part 367 changes the position and the attitude of the control point T1 by the force control to a position and an attitude in which the force detection values contained in the force detection information acquired by the force detection information acquisition part 361 satisfy a first predetermined condition. The first predetermined condition is to satisfy the respective following three conditions 1) to 3) in the example. Note that the first predetermined condition may satisfy another condition in place of part or all of the three conditions or another condition in addition to the three conditions.

1) The magnitude of the force applied in the positive direction of the Z-axis directions of the control point coordinate system TC1 of the forces applied to the control point T1 is equal to or larger than a predetermined value (i.e., the magnitude of the force acting in the positive direction of the Z-axis directions of the force detection coordinate system of the forces detected by the force detection unit 21 is equal to or larger than a predetermined value)

2) The magnitudes of the forces applied in the X-axis direction and the Y-axis direction of the control point coordinate system TC1 of the forces applied to the control point T1 is 0 [N] (i.e., the magnitudes of the forces acting in the X-axis direction and the Y-axis direction of the force detection coordinate system of the forces detected by the force detection unit 21 are 0 [N])

3) All of the magnitudes of the moment about the respective coordinate axes of the control point coordinate system TC1 of the moment applied to the control point T1 are 0 [N·m] (i.e., all of the magnitudes of the moment about the respective coordinate axes of the force detection coordinate system of the moment detected by the force detection unit 21 are 0 [N·m])

The positive direction of the Z-axis directions of the control point coordinate system TC1 is, in the example, a direction from the position of the center of gravity of the first object O1 as the position of the control point T1 toward the end effector E along the rotation shaft of the joint that rotates the end effector E of the joints of the manipulator M. In the example shown in FIG. 5, as described above, the attitude of the first object O1 and the attitude of the second object O2 are different due to the error. However, the robot control part 367 has judged that the attitude of the control point T1 is allowed to coincide with the attitude of the waiting taught point at step S120. That is, the part has judged that the attitude of the first object O1 is allowed to coincide with the attitude of the second object O2. Accordingly, when moving the control point T1 to satisfy the above described first predetermined condition by the force control, the robot control part 367 moves the control point T1 in the above described direction A1 for realizing the state that satisfies the above described direction A1.

After the robot control part 367 starts to move the control point T1 by the force control at step S130, the control point T1 acquires the force detection information from the force detection information acquisition part 361. Then, the robot control part 367 continues the movement of the control point T1 by the force control, which has been started at step S130, until the magnitudes of the moment indicated by the force detection values contained in the acquired force detection information satisfy a second predetermined condition (step S140). The second predetermined condition is the following condition 1A) in the example. Note that the second predetermined condition may have a configuration that satisfies another condition in place of the configuration that satisfies the condition 1A) or may have a configuration that satisfies another condition in addition to the configuration that satisfies the condition 1A).

1A) The moment about the X-axis of the moment applied to the control point T1 exceeds a predetermined first threshold value (i.e., the magnitude of the moment about the X-axis of the force detection coordinate system of the moment detected by the force detection unit 21 exceeds a first threshold value)

The first threshold value is a value slightly smaller than the maximum value of the moment applied to the first object O1 from the second surface M2. The slightly smaller value is e.g. a value smaller than the maximum value by about 10%. Note that the slightly smaller value may be a value smaller than the maximum value by another rate instead. The first threshold value may be calculated using the speed at which the control point T1 moves and the force with which the end effector E presses the first object O1 against the second surface M2. Further, the first threshold value may be determined by an experiment performed in advance. The experiment is an experiment that repeatedly detects the moment applied to the first object O1 from the second surface M2 by allowing the robot 20 to repeatedly perform the operation by the processing at step S130.

Note that, as step S104, the robot control part 367 may continue the movement of the control point T1 that has been started at step S130 until the force indicated by the force detection values contained in the acquired force detection information satisfy some condition. For example, the condition is that the force in the positive direction of the Z-axis of the forces exceeds a predetermined force or the like.

If a determination that the moment indicated by the force detection values contained in the force detection information acquired by the force detection information acquisition part 361 satisfies the second predetermined condition is made (step S140—YES), the robot control part 367 starts movement of the control point T1 by the force control and the position control (step S150). Specifically, the robot control part 367 changes the attitude of the control point T1 by the position control to an attitude that realizes a state in which the magnitude of the moment applied to the first object O1 from the second surface M2 by the position control is a magnitude closer to 0 [N·m] than the magnitude of the moment at the present. In this regard, the robot control part 367 changes the attitude of the control point T1 while continuing the movement of the control point T1 by the force control that has been started at step S130. Thereby, the robot control part 367 may change the attitude of the control point T1 by the position control that may change the position and the attitude of the control point T1 more quickly than the force control. As a result, the robot control part 367 may suppress the longer time taken for the work of bringing the first object O1 and the second object O2 into surface contact.

Figure 7:
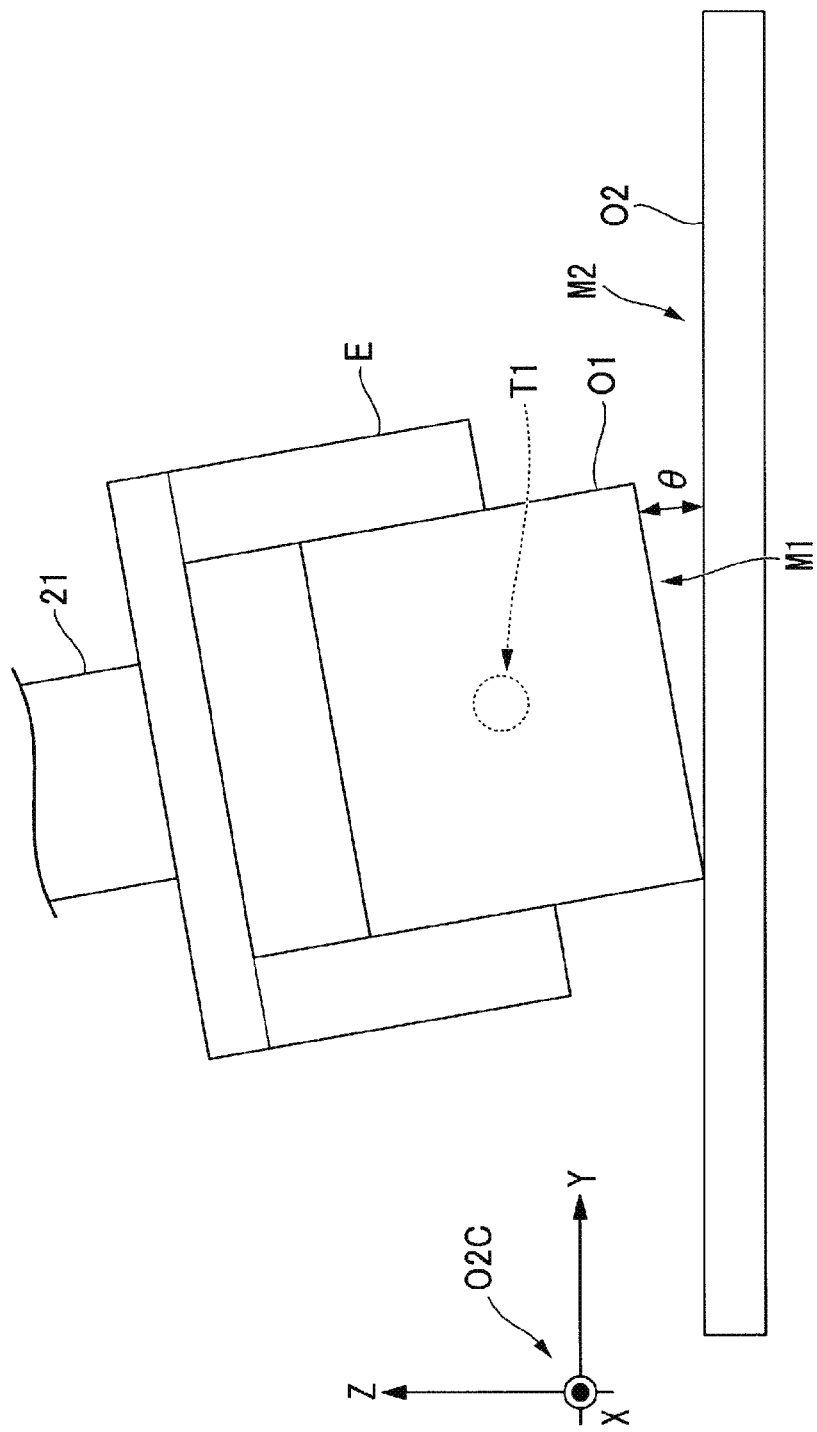
FIG. 7 shows an example of a state of the first object O1 and the second object O2 at a time when the first object O1 comes into contact with the second object O2 by the processing at step S130.
Figure 8:
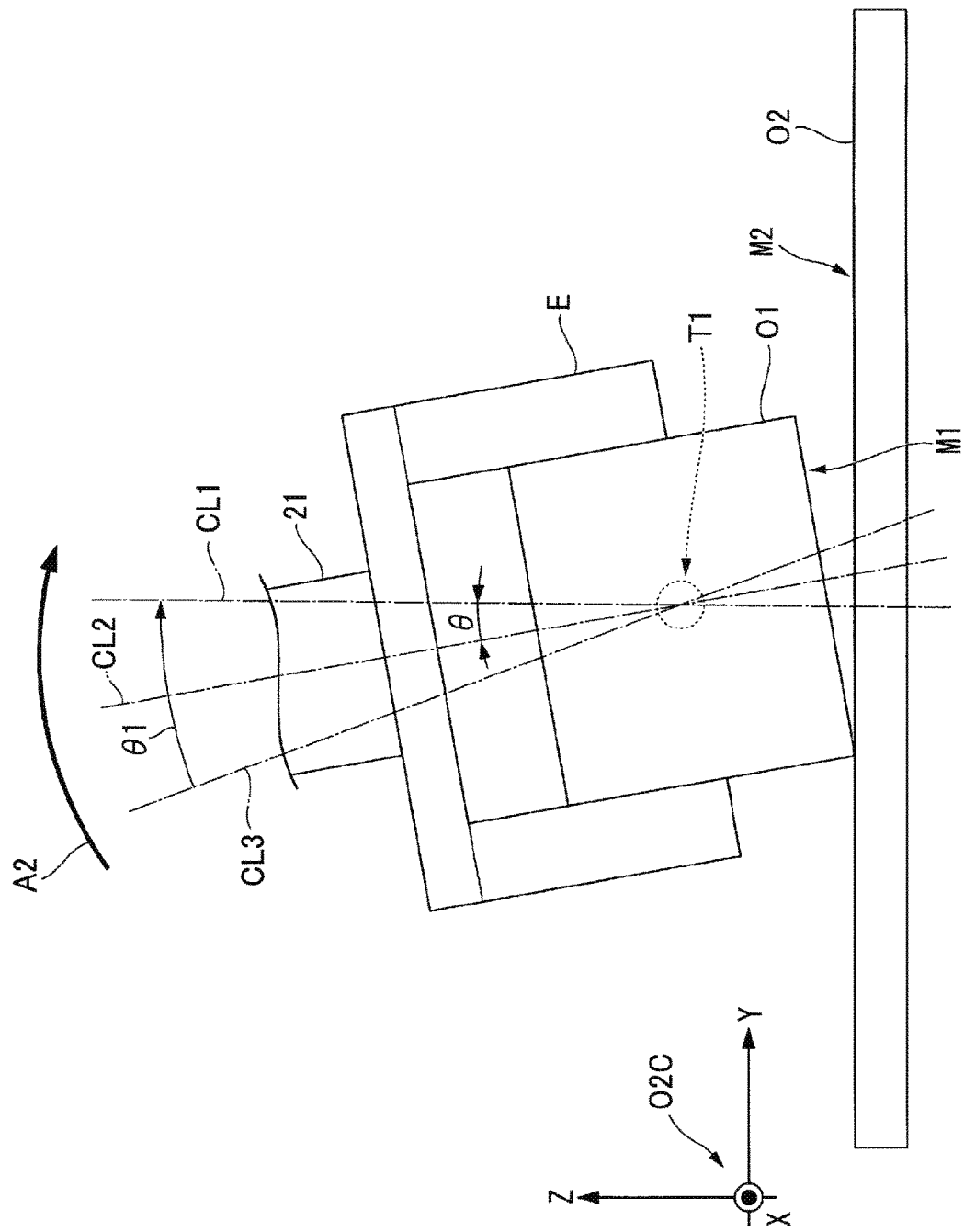
FIG. 8 is a diagram with the addition of auxiliary lines etc. to FIG. 7 for explanation of a predetermined distance and a predetermined direction.

Here, referring to FIGS. 7 and 8, the processing at step S140 to step S150 is explained. FIG. 7 shows an example of a state of the first object O1 and the second object O2 at a time when the first object O1 comes into contact with the second object O2 by the processing at step S130. When the control point T1 is moved in the direction A1 shown in FIG. 6 by the processing at step S130, the first object O1 comes into contact with the second surface M2 as shown in FIG. 7. In the example, as described above, the first surface M1 is tilted by the angle θ with respect to the second surface M2. Accordingly, the side on the negative direction side of the Y-axis in the control point coordinate system TC1 of the four sides of the first surface M1 comes into contact with the second surface M2. In this case, when the control point T1 continues to move in the direction A1 shown in FIG. 6, the moment about the X-axis of the control point coordinate system TC1 is applied to the first object O1 from the second surface M2. The processing at step S140 is a determination as to whether or not the magnitude of the moment exceeds the first threshold value.

Further, in the processing at step S150, the robot control part 367 changes the attitude of the control point T1 by the position control while continuing the movement of the control point T1 by the force control that has been started at step S130. Specifically, the robot control part 367 starts to move the control point T1 to a predetermined distance based on a predetermined velocity while continuing the movement of the control point T1 by the force control. The predetermined velocity includes a predetermined speed and a predetermined direction. That is, the robot control part 367 performs position control of moving the control point T1 to the predetermined distance at the predetermined speed in the predetermined direction while continuing the movement of the control point T1 by the force control. As described above, in the processing at step S150, the robot control part 367 changes the attitude of the control point T1. That is, in the example, the predetermined direction is a rotation direction in which the attitude of the control point T1 is changed. Further, the predetermined distance is a rotation angle at which the attitude of the control point T1 is changed. Furthermore, the predetermined speed is an angular velocity at which the attitude of the control point T1 is rotated.

Here, referring to FIG. 8, the predetermined distance and the predetermined direction are explained. FIG. 8 is a diagram with addition of auxiliary lines etc. to FIG. 7 for explanation of the predetermined distance and the predetermined direction. The auxiliary line CL1 shown in FIG. 8 is a line passing through the origin of the control point coordinate system TC1 and orthogonal to the second surface M2. Further, the auxiliary line CL2 is a line passing through the origin of the control point coordinate system TC1 and orthogonal to the first surface M1. As described above, the attitude of the first object O1 is tilted with respect to the attitude of the second object O2 due to the error and the auxiliary line CL1 and the auxiliary line CL2 are not aligned. The angle between the auxiliary line CL1 and the auxiliary line CL2 is the angle $\theta$ because the angle between the first surface M1 and the second surface M2 is the angle $\theta$ as shown in FIG. 5.

To realize a state in which the magnitude of the moment applied to the first object O1 from the second surface M2 is a magnitude closer to 0 [N·m] (nearly 0 [N·m]) than the magnitude of the moment at the time when the processing at step S150 is started, it is necessary to rotate the attitude of the first object O1 to make the angle between the auxiliary line CL1 and the auxiliary line CL2 an angle close to 0°. Regardless of the tilt of the first surface M1 with respect to the second surface M2 due to the error, the robot control part 367 may reliably realize the state by rotating the attitude of the first object O1 by the angle between the first surface M1 and the second surface M2 in the case of the maximum error. Further, in the state, the magnitude of the moment applied to the first object O1 from the second surface M2 is nearly 0 [N·m] as described above. Accordingly, in the example, the angle to which the control point T1 rotates in the predetermined direction at the predetermined speed from the time when the magnitude of the moment applied to the first object O1 from the second surface M2 exceeds the first threshold value till when the magnitude becomes less than the second threshold value is determined as the predetermined distance. The second threshold value is e.g. a value having a magnitude of about 5% of the first threshold value. Note that the second threshold value may be another value such as 0 [N·m] instead. Further, the predetermined direction is determined by an experiment performed in advance. The experiment is an experiment for specifying the direction in which the tilt of the first surface M1 with respect to the second surface M2 due to the error is eliminated by repeating the processing at step S120. Furthermore, the predetermined speed is an angular velocity input by the user in advance and may be any angular velocity.

The auxiliary line CL3 shown in FIG. 8 is a line orthogonal to the first surface M1 when the first surface M1 tilts with respect to the second surface M2 by an angle $\theta 1$ and passing through the origin of the control point coordinate system TC1. The angle $\theta 1$ is an angle between the first surface M1 and the second surface M2 when the above described error is the maximum. As below, as an example, the case where the above described predetermined distance is determined as the angle $\theta 1$ shown in FIG. 8 will be explained. In this case, the predetermined direction is a direction A2 indicated by an arrow shown in FIG. 8.

In the above described manner, the predetermined distance and the predetermined direction are determined. Note that, as the predetermined speed is increased, the time taken for the robot 20 bringing the first surface M1 into surface contact with the second surface M2 is shorter. The predetermined distance, the predetermined direction, and the predetermined speed are respectively determined, and then, the user inputs information representing the predetermined distance, information representing the predetermined direction, and information representing the predetermined speed in the robot control part 367 in advance. The robot control part 367 changes the attitude of the control point T1 by moving the control point T1 to the predetermined distance at the predetermined speed in the predetermined direction by the position control started at step S150 based on the three pieces of information input by the user in advance.

However, it is possible that the second object O2 is deformed by the first object O1 if the robot control part 367 only executes the processing at step S150. For example, when the above described error is not the maximum, the robot control part 367 excessively rotates the attitude of the first object O1 and brings the opposite side to the side of the first surface M1 in contact with the second surface M2 in FIG. 8 into contact with the second surface M2 by the position control. Thereby, it is possible that the robot control part 367 deforms the second object O2 by the first object O1. To suppress the possibility, the robot control part 367 executes the processing at step S150, and then, executes processing at step S160 to step S170.

After the movement of the control point T1 by the position control is started at step S150, the robot control part 367 continues to move the control point T1 that has been started at step S150 until the moment indicated by the force detection values contained in the acquired force detection information satisfy a third predetermined condition (step S160). The third predetermined condition is the following condition 1B) in the example. Note that the third predetermined condition may have a configuration that satisfies another condition in place of the configuration that satisfies the condition 1B) or may have a configuration that satisfies another condition in addition to the configuration that satisfies the condition 1B).

1B) The moment about the X-axis of the moment applied to the control point T1 is less than a predetermined second threshold value (i.e., the magnitude of the moment about the X-axis of the force detection coordinate system of the moment detected by the force detection unit 21 is less than a second threshold value).

If a determination that the moment indicated by the force detection values contained in the force detection information acquired by the force detection information acquisition part 361 satisfies the third predetermined condition is made (step S160—YES), the robot control part 367 stops moving the control point T1 by the position control that has been started at step S150, and moves the control point T1 only by the force control that has been started at step S130 (step S170). Here, the processing at step S160 to step S170 is explained.

In the state of the first object O1 and the second object O2 shown in FIG. 8, when the attitude of the first object O1 is rotated in the direction A2, the moment about the X-axis of the moment applied to the control point T1 becomes smaller. Then, when the magnitude of the moment becomes less than the second threshold value, the robot control part 367 stops moving the control point T1 by the position control that has been started at step S150, and moves the control point T1 only by the force control that has been started at step S130. That is, in the processing at step S170, the robot control part 367 moves the control point T1 by the force control until the force indicated by the force detection values contained in the force detection information acquired by the force detection information acquisition part 361 satisfies the above described first predetermined condition.

Figure 9:
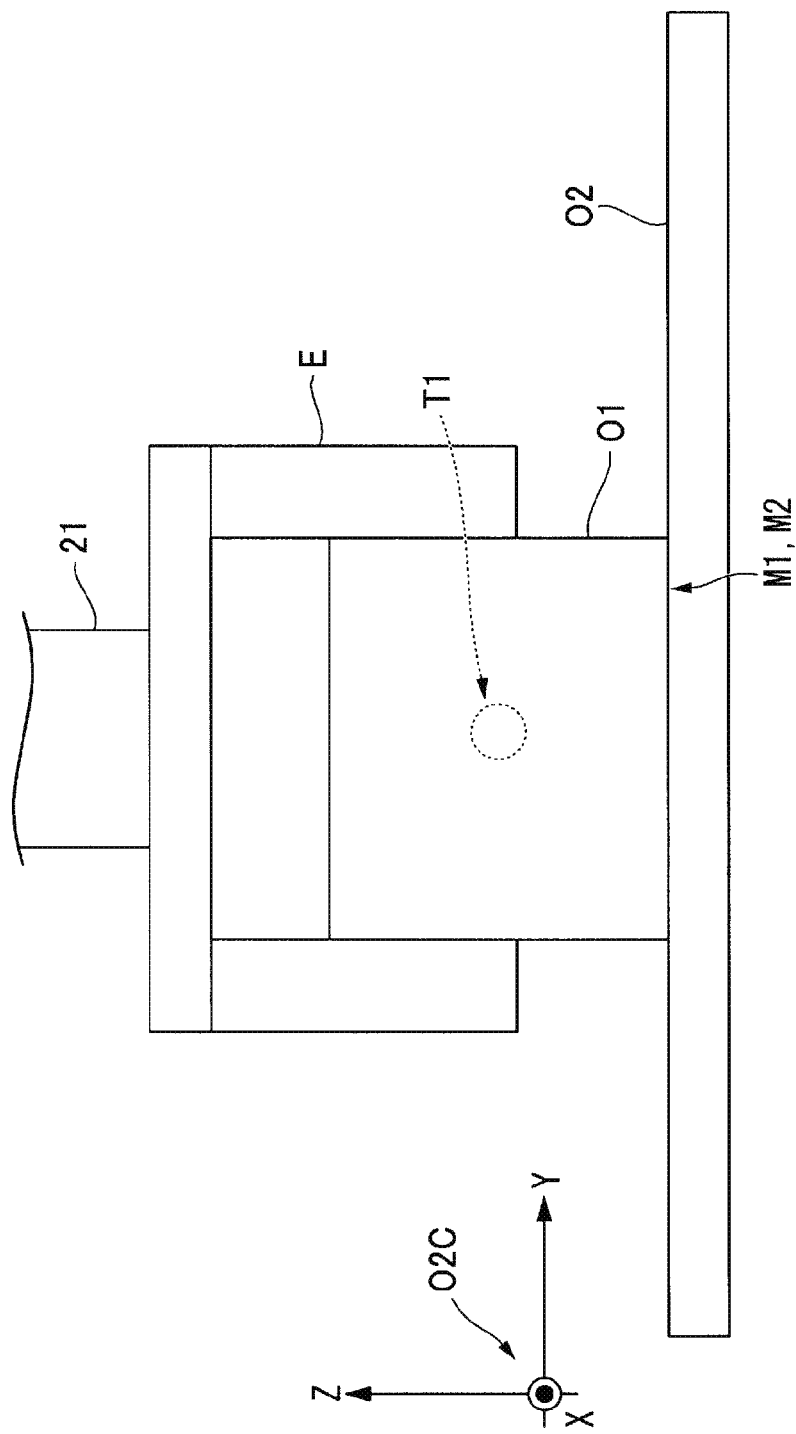
FIG. 9 shows an example of a state in which a first surface M1 of the first object O1 is in surface contact with a second surface M2 of the second object O2.

After the movement of the of the control point T1 only by the force control is started at step S170, the robot control part 367 determines whether or not the first surface M1 has come into surface contact with second surface M2 (step S180). If determining that the force and the moment indicated by the force detection values contained in the force detection information acquired by the force detection information acquisition part 361 do not satisfy the above described first predetermined condition at step S180, the robot control part 367 determines that the first surface M1 is not in surface contact with the second surface M2. On the other hand, if determining that the force and the moment indicated by the force detection values contained in the force detection information acquired by the force detection information acquisition part 361 satisfy the above described first predetermined condition at step S180, the robot control part 367 determines that the first surface M1 is in surface contact with the second surface M2 as shown in FIG. 9. FIG. 9 shows an example of a state in which the first surface M1 of the first object O1 is in surface contact with the second surface M2 of the second object O2.

If determining that the first surface M1 is not in surface contact with the second surface M2 at step S180 (step S180—NO), the robot control part 367 transitions to step S180 and determines whether or not the first surface M1 has come into surface contact with the second surface M2 again. On the other hand, if determining that the first surface M1 is in surface contact with the second surface M2 (step S180—YES), the robot control part 367 moves the control point T1 to a predetermined end position and ends the processing.

Figure 10:
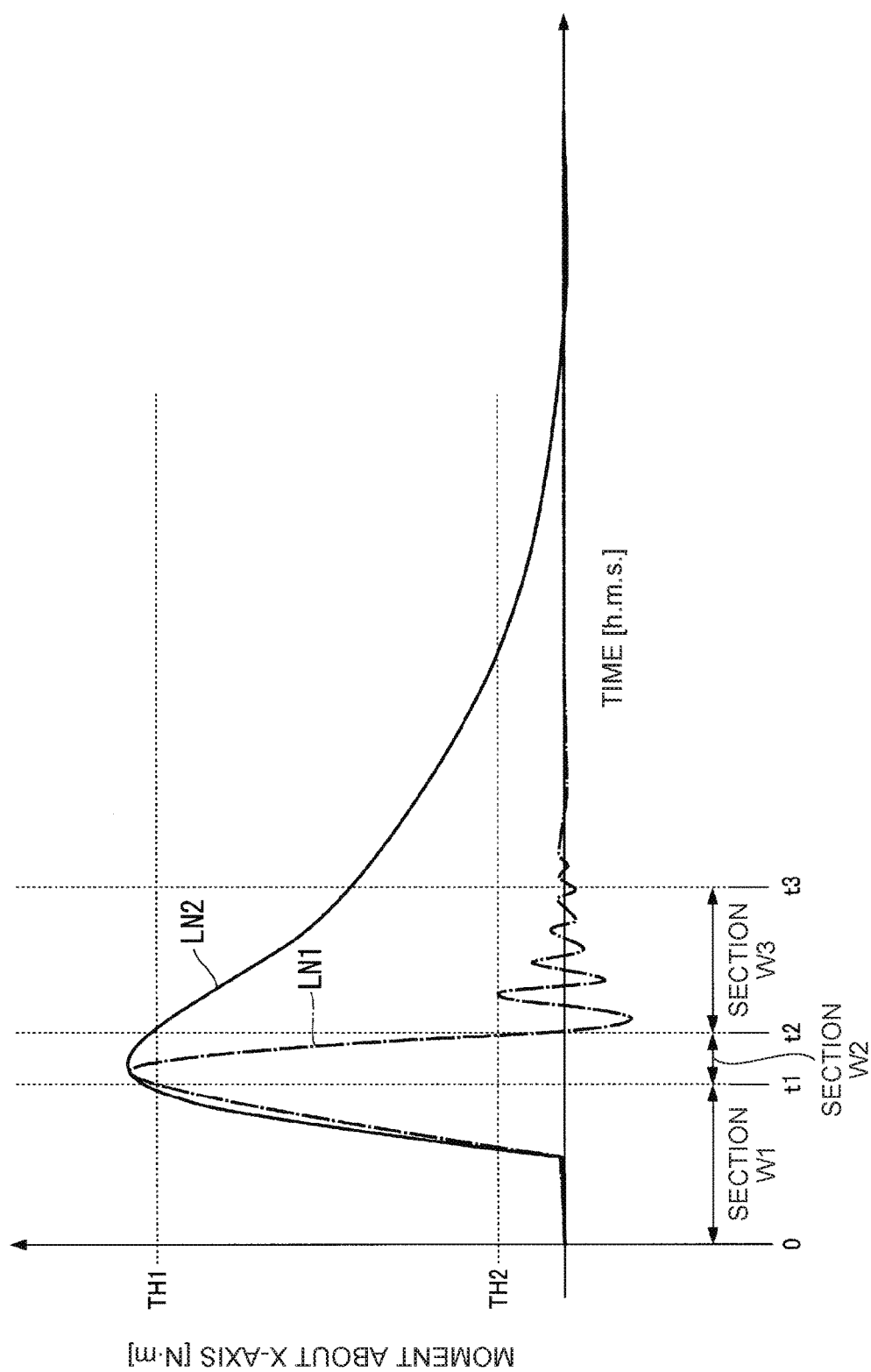
FIG. 10 shows examples of changes of moment about an X-axis of moment applied to the control point T1 in a predetermined work.

Here, referring to FIG. 10, the times taken for works in the case where the robot 20 is allowed to perform the predetermined work by the processing of the flowchart shown in FIG. 4 and the case where the robot 20 is allowed to perform the work by processing without the processing at step S140 to step S170 in the flowchart are compared. FIG. 10 shows examples of changes of the moment about the X-axis of the moment applied to the control point T1 in the predetermined work.

The graph shown in FIG. 10 is a graph showing temporal changes of the moment about the X-axis of the moment applied to the control point T1 when the robot 20 performs the predetermined work. The longitudinal axis of the graph indicates the magnitude of the moment. The lateral axis of the graph indicates an elapsed time. Further, the origin of the graph coincides with the time when the robot control part 367 starts the processing at step S130.

A magnitude TH1 of the moment on the longitudinal axis of the graph shown in FIG. 10 shows the above described first threshold value. Further, a magnitude TH2 of the moment shows the above described second threshold value. A curve LN1 in the graph is a curve showing the change in the case where the robot control part 367 allows the robot 20 to perform the predetermined work by the processing of the flowchart shown in FIG. 4, the temporal change of the moment about the X-axis of the moment applied to the control point T1. Further, a curve LN2 in the graph is a curve showing the change in the case where the robot control part 367 allows the robot 20 to perform the predetermined work without the processing at step S140 to step S170 in the flowchart, the temporal change of the moment about the X-axis of the moment applied to the control point T1. A time t1 on the lateral axis of the graph shows a time when the moment exceeds the first threshold value. Further, a time t2 on the lateral axis of the graph shows a time when the moment becomes less than the second threshold value. Furthermore, a time t3 on the lateral axis of the graph shows a time when the above described first predetermined condition is satisfied.

A section W1 in the graph shown in FIG. 10 shows a section in which the robot control part 367 moves the control point T1 only by the force control. Further, a section W2 in the graph shown in FIG. 10 shows a section in which the robot control part 367 moves the control point T1 by the force control and the position control. Furthermore, a section W3 in the graph shown in FIG. 10 shows a section in which the robot control part 367 moves the control point T1 only by the force control.

It is known from the graph shown in FIG. 10 that the first surface M1 of the first object O1 and the second surface M2 of the second object O2 may be brought into surface contact more quickly in the case the robot control part 367 allows the robot 20 to perform the predetermined work by the processing of the flowchart shown in FIG. 4 than in the case where the robot control part 367 allows the robot 20 to perform the predetermined work without the processing at step S140 to step S170 in the flowchart.

As described above, when moving the first object O1 closer to the second object O2, if the magnitude of the moment detected by the force detection unit 21 exceeds the first threshold value, the robot control apparatus 30 starts to allow the robot 20 to perform the operation of bringing the first surface M1 of the first object O1 into surface contact with the second surface M2 of the second object O2 by the position control based on the predetermined distance and the predetermined velocity. Thereby, the robot control apparatus 30 may suppress the longer time taken for the work of bringing the first object O1 and the second object O2 into surface contact.

Modified Example of Embodiment

As below, referring to FIG. 11, a modified example of the embodiment will be explained. The predetermined work explained as above may be another work such as a work of fitting a first fitting part M3 of a first object O3 in a second fitting part M4 of a second object O4. Accordingly, as below, the case where the robot control apparatus 30 according to the modified example of the embodiment allows the robot 20 to perform a work of fitting the first fitting part M3 of the first object O3 in the second fitting part M4 of the second object O4 will be explained.

Figure 11:
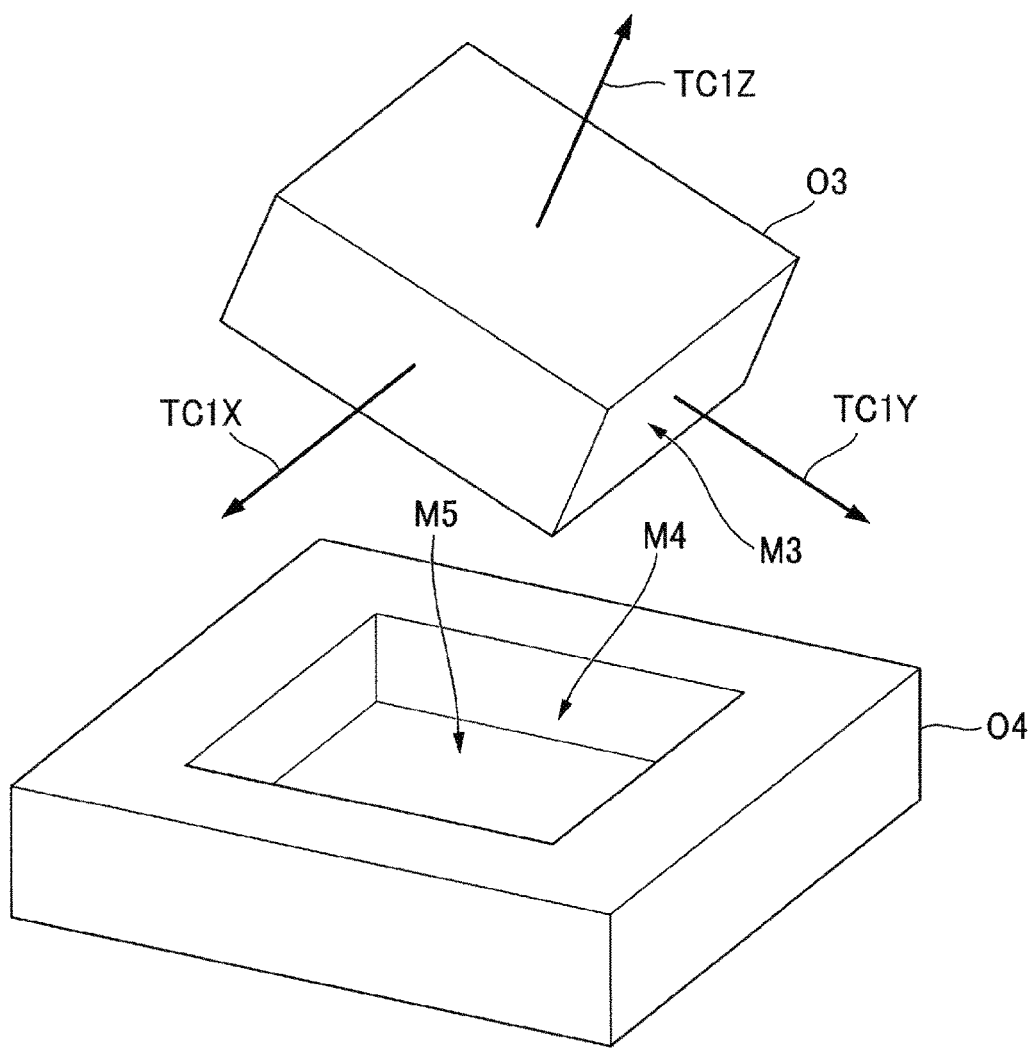
FIG. 11 exemplifies a first object O3 and a second object O4 to be fitted together by the robot 20 in a modified example of the embodiment.

FIG. 11 exemplifies the first object O3 and the second object O4 to be fitted together by the robot 20 in the modified example of the embodiment.

The first object O3 is an industrial component, member, product, or the like. Note that the first object O3 may be another object such as a commodity component, member, product different from those for industry or a living organism instead. In the example shown in FIG. 11, the first object O3 is shown as an object having a rectangular parallelepiped shape. The shape of the first object O3 may be another shape in place of the rectangular parallelepiped shape. In the example, the first object O3 is grasped by the end effector E in advance.

The control point T1 is set to a position of a center of gravity of the first object O3 like the first object O1. An X-axis TC1X shown in FIG. 11 shows the X-axis of the control point coordinate system TC1. Further, a Y-axis TC1Y shown in FIG. 11 shows the Y-axis of the control point coordinate system TC1. Furthermore, a Z-axis TC1Z shown in FIG. 11 shows the Z-axis of the control point coordinate system TC1. As is the case of the above described embodiment, directions of the respective coordinate axes of the control point coordinate system TC1 in the robot coordinate system RC show an attitude of the first object O3.

The first object O3 has the first fitting part M3 to be fitted in the second fitting part M4 of the second object O4. In the example, the first fitting part M3 is a part including a bottom surface as a surface on the negative direction side of the Z-axis TC1Z shown in FIG. 11 of the surfaces of the first object O3. Note that the first fitting part M3 may be the entire of the first object O3 or another part of the first object O3 instead.

The second object O4 is an industrial component, member, product, or the like. Note that the second object O4 may be another object such as a commodity component, member, product different from those for industry or a living organism instead. In the example shown in FIG. 11, the second object O4 is shown as an object having a rectangular parallelepiped shape. The shape of the second object O4 may be another shape in place of the rectangular parallelepiped shape. Further, the second fitting part M4 is provided on an upper surface of the second object O4. The second fitting part M4 is a recessed part provided in the second object O4 to be fitted with the first fitting part M3.

The robot control apparatus 30 performs a work of fitting the first fitting part M3 of the first object O3 in the second fitting part M4 of the second object O4 as the predetermined work as described above. When the robot control apparatus 30 allows the control point T1 to coincide with the above described waiting taught point, as described above, the attitude of the first object O3 may tilt with respect to the attitude of the second object O4 due to the error. In the example shown in FIG. 11, the attitude of the first object O3 is rotated about the X-axis TC1X and the Y-axis TC1Y from the attitude that coincides with the attitude of the second object O4 and tilts with respect to the attitude of the second object O4.

Here, regarding the robot control apparatus 30, in the above described embodiment, when the control point T1 coincides with the waiting taught point, the attitude of the first object O1 tilts with respect to the attitude of the second object O2 due to the error. Specifically, the attitude of the first object O1 is rotated about the X-axis TC1 of the control point coordinate system TC1 from the attitude that coincides with the attitude of the second object O2 and tilts with respect to the attitude of the second object O2. In the embodiment, the robot control apparatus 30 executes the processing of the flowchart shown in FIG. 4 to rotate the attitude of the control point T1 about the X-axis, and thereby, brings the first surface M1 and the second surface M2 into surface contact.

In the modified example of the embodiment, the attitude of the first object O3 is rotated about the X-axis TC1X and the Y-axis TC1Y from the attitude that coincides with the attitude of the second object O4 and tilts with respect to the attitude of the second object O4. Accordingly, the robot control apparatus 30 rotates the attitude of the control point T1 about the X-axis TC1X by the processing of the flowchart shown in FIG. 4. Further, the robot control apparatus 30 rotates the attitude of the control point T1 about the Y-axis TC1Y by the processing of the flowchart shown in FIG. 4. Thereby, the robot control apparatus 30 makes the bottom surface of the first object O3 parallel to a bottom surface M5 of the second fitting part M4 and fits the first fitting part M3 and the second fitting part M4 together by the force control.

In the above described manner, the robot control apparatus 30 according to the modified example of the embodiment allows the robot 20 to perform the work of fitting the first fitting part M3 of the first object O3 in the second fitting part M4 of the second object O4 as the predetermined work. Thereby, the robot control apparatus 30 may suppress the longer time taken for the work of fitting the first object O3 and the second object O4 together.

As described above, the robot control apparatus 30 moves the first object (in the example, the first object O1) closer to the second object (in the example, the second object O2) and, if the magnitude of at least one of the force and the moment detected by the force detector (in the example, the force detection unit 21) exceeds the predetermined first threshold value, starts to allow the robot 20 to perform the operation of bringing the first surface of the first object into surface contact with the second surface of the second object according to the position control and the force control based on the predetermined distance and the predetermined velocity. Thereby, the robot control apparatus 30 may suppress the longer time taken for the work of bringing the first object and the second object into surface contact.

Further, the robot control apparatus 30 moves the first object (in the example, the first object O3) closer to the second object (in the example, the second object O4) and, if the magnitude of at least one of the force and the moment detected by the force detector exceeds the predetermined first threshold value, starts to allow the robot to perform the operation of fitting the first fitting part (in the example, the first fitting part M3) of the first object in the second fitting part (in the example, the second fitting part M4) of the second object according to the position control and the force control based on the predetermined distance and the predetermined velocity. Thereby, the robot control apparatus 30 may suppress the longer time taken for the work of fitting the first object and the second object together.

When moving the first object at the time when the magnitude of at least one of the force and the moment detected by the force detector exceeds the first threshold value based on the predetermined velocity using the robot 20, the robot control apparatus 30 moves the first object by the position control based on the predetermined distance as the distance to which the first object moves until the magnitude becomes less than the predetermined second threshold value and the predetermined velocity. Thereby, the robot control apparatus 30 may suppress the longer time taken for the work of bringing the first object and the second object into surface contact based on the predetermined distance as the distance to which the first object moves until the magnitude of at least one of the force and the moment detected by the force detector becomes less than the predetermined second threshold value and the predetermined velocity.

Further, after the magnitude of at least one of the force and the moment detected by the force detector becomes less than the second threshold value, the robot control apparatus 30 performs the force control not the position control. Thereby, the robot control apparatus 30 may suppress the deformation of the object by the operation of the robot 20 according to the position control after the magnitude of at least one of the force and the moment detected by the force detector becomes less than the second threshold value.

Furthermore, before the magnitude of at least one of the force and the moment detected by the force detector exceeds the first threshold value, the robot control apparatus 30 performs the force control not the position control. Thereby, the robot control apparatus 30 may suppress the deformation of the object by the operation of the robot 20 according to the position control before the magnitude of at least one of the force and the moment detected by the force detector exceeds the first threshold value.

As above, the embodiment of the invention is described in detail with reference to the drawings. The specific configurations are not limited to the embodiment and changes, replacements, deletions, etc. may be made without departing from the scope of the invention.

A program for realizing a function of an arbitrary configuration part in the above described apparatus (e.g. the robot control apparatus 30) may be recorded in a computer-readable recording medium and the program may be read into a computer system and executed. Note that "computer system" here includes an OS (Operating System) and hardware such as a peripheral. Further, "computer-readable recording medium" refers to a portable medium such as a flexible disk, magnetooptical disk, ROM, CD (Compact Disk)-ROM or a storage device such as a hard disk built in the computer system. Furthermore, "computer-readable recording medium" includes a medium that holds a program in a fixed period such as a volatile memory (RAM) within the computer system serving as a server or client when the program is transmitted via a network such as the Internet or a communication line such as a phone line.

The program may be transmitted from the computer system in which the program is stored in a memory device or the like via a transmission medium or transmission wave within the transmission medium to another computer system. Here, "transmission medium" for transmission of the program refers to a medium having a function of transmitting information including a network (communication network) such as the Internet and a communication line such as a phone line.

Further, the program may realize part of the above described function. Furthermore, the program may realize the above described function in combination with a program that has been already recorded in the computer system, the so-called differential file (differential program).

The entire disclosure of Japanese Patent Application No. 2016-047947, filed Mar. 11, 2016 is expressly incorporated by reference herein.

What is claimed is:
1. A robot control apparatus comprising:
a force sensor attached to a motor driven arm of a robot, the force sensor being configured to detect a force applied to the arm so as to output detected force information;
a memory configured to store computer-readable instructions and taught point information, the taught point information including a taught point position in a robot coordinate system; and
a processor configured to execute the computer-readable instructions so as to:
read the taught point information from the memory;
move a first object held by the arm toward a second object based on the detected force information only by power control corresponding to the taught point information until the processor determines that the detected force information satisfies a first predetermined condition;
move the first object held by the arm toward the second object by the power control and position control after the detected force information satisfies the first predetermined condition until the processor determines that the detected force information satisfies a second predetermined condition;
stop the position control when the detected force information satisfies the second predetermined condition; and
move the first object held by the arm toward the second object based on the detected force information only by the power control after the processor stops the position control,
wherein the processor is configured to move the first object held by the arm based on only the detected force information in the power control, and
the processor is configured to move the first object held by the arm based on only position information and attitude information according to the taught point information in the position control.
2. The robot control apparatus according to claim 1,
wherein the first object and the second object have one of a first configuration or a second configuration,
the first object has a first surface and the second object has a second surface in the first configuration, and the processor is configured to move the first object toward the second object so that the first surface completely contacts the second surface, and
the first object has a first fitting part and the second object has a second fitting part in the second configuration, and the processor is configured to move the first object toward the second object so that the first fitting part is completely fit into the second fitting part.
3. A robot controlled by the robot control apparatus according to claim 2, comprising:
a base;
a plurality of arms, a proximal end of the plurality of arms being connected to the base; and
an end effector connected to a distal end of the plurality of arms,
wherein the end effector is configured to grasp the first object.
4. A robot system comprising:
the robot control apparatus according to claim 2; and
a robot controlled by the robot control apparatus, the robot including:
a base;
a plurality of arms, a proximal end of the plurality of arms being connected to the base; and an end effector connected to a distal end of the plurality of arms, wherein the end effector is configured to grasp the first object.

5. The robot control apparatus according to claim 1, wherein the processor is configured to move a control point relating to the arm in the robot coordinate system only by the position control so that the control point coincides with the taught point position represented by the taught point information after the processor reads the taught point information from the memory and before the processor moves the first object held by the arm toward the second object based on the detected force information only by the power control.

6. The robot control apparatus according to claim 5, wherein the processor is configured to determine that the first object is disposed at an ideal position with respect to the second object when a detected value of the detected force information satisfies a third predetermined condition.

7. The robot control apparatus according to claim 6, where when the processor determines that the first object is disposed at the ideal position with respect to the second object, the processor is configured to move the arm to a predetermined position at which the control point is at the predetermined position.

8. A robot controlled by the robot control apparatus according to claim 7, comprising:
a base;
a plurality of arms, a proximal end of the plurality of arms being connected to the base; and
an end effector connected to a distal end of the plurality of arms,
wherein the end effector is configured to grasp the first object.

9. A robot system comprising:
the robot control apparatus according to claim 7; and
a robot controlled by the robot control apparatus, the robot including:
a base;
a plurality of arms, a proximal end of the plurality of arms being connected to the base; and
an end effector connected to a distal end of the plurality of arms,
wherein the end effector is configured to grasp the first object.

10. A robot controlled by the robot control apparatus according to claim 6, comprising:
a base;
a plurality of arms, a proximal end of the plurality of arms being connected to the base; and
an end effector connected to a distal end of the plurality of arms,
wherein the end effector is configured to grasp the first object.

11. A robot system comprising:
the robot control apparatus according to claim 6; and
a robot controlled by the robot control apparatus, the robot including:
a base;
a plurality of arms, a proximal end of the plurality of arms being connected to the base; and
an end effector connected to a distal end of the plurality of arms,
wherein the end effector is configured to grasp the first object.

12. A robot controlled by the robot control apparatus according to claim 5, comprising:
a base;
a plurality of arms, a proximal end of the plurality of arms being connected to the base; and
an end effector connected to a distal end of the plurality of arms,
wherein the end effector is configured to grasp the first object.

13. A robot system comprising:
the robot control apparatus according to claim 5; and
a robot controlled by the robot control apparatus, the robot including:
a base;
a plurality of arms, a proximal end of the plurality of arms being connected to the base; and
an end effector connected to a distal end of the plurality of arms,
wherein the end effector is configured to grasp the first object.

14. A robot controlled by the robot control apparatus according to claim 1, comprising:
a base;
a plurality of arms, a proximal end of the plurality of arms being connected to the base; and
an end effector connected to a distal end of the plurality of arms,
wherein the end effector is configured to grasp the first object.

15. A robot system comprising:
the robot control apparatus according to claim 1; and
a robot controlled by the robot control apparatus, the robot including:
a base;
a plurality of arms, a proximal end of the plurality of arms being connected to the base; and
an end effector connected to a distal end of the plurality of arms,
wherein the end effector is configured to grasp the first object.

* * * * *